KINYON & HOLLINGSWORTH.
Cotton Gin.
No. 14,725.                                    Patented April 22, 1856.
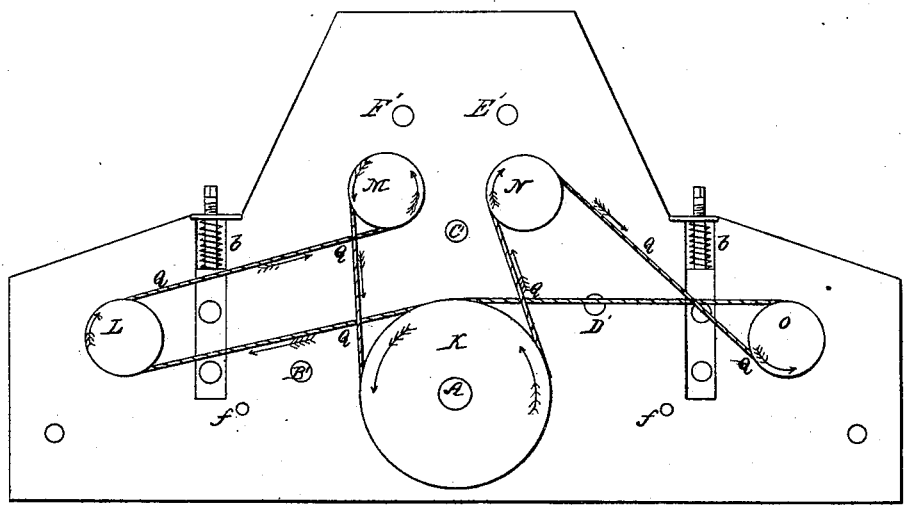
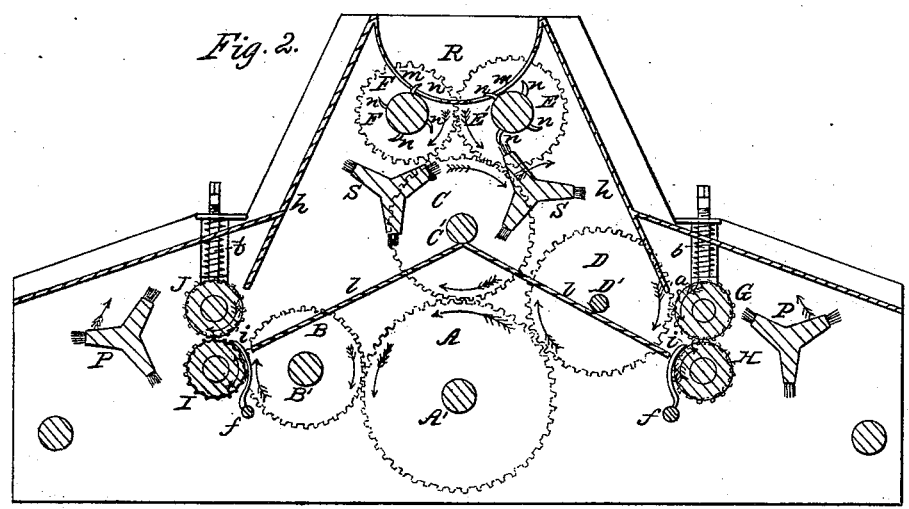
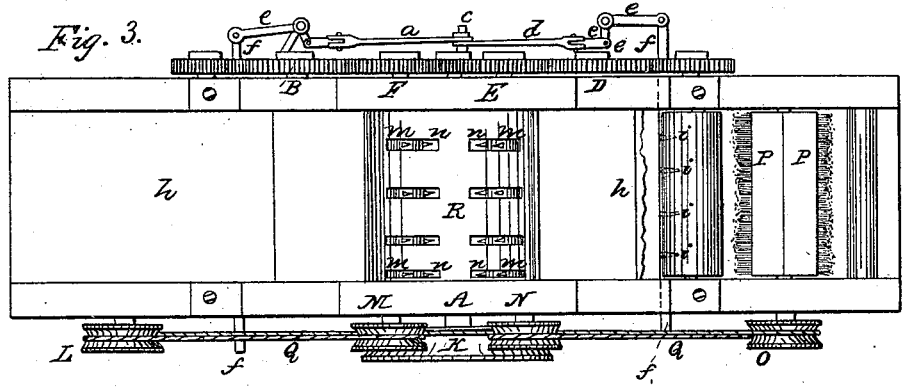

UNITED STATES PATENT OFFICE.

JAS. H. KINYON AND JAS. HOLLINGSWORTH, OF CHICAGO, ILLINOIS.

IMPROVEMENT IN COTTON-CLEANERS.

Specification forming part of Letters Patent No. 14,725, dated April 22, 1856.

*To all whom it may concern:*

Be it known that we, JAMES H. KINYON and JAMES HOLLINGSWORTH, of Chicago, in the county of Cook and State of Illinois, have invented certain new and useful Improvements in Machines for Cleaning Cotton, &c.; and we do hereby declare the following to be a full, clear, and exact description of the same, reference being had to the accompanying drawings, in which—

Figure 1 represents a view from one of the sides. Fig. 2 represents a longitudinal vertical section through the machine, with the gearing dotted in which is on the opposite side of the machine from Fig. 1. Fig. 3 represents a top plan.

Similar letters, where they occur in the several figures, denote like parts in all.

The power to drive the machine is transmitted from any first mover through a crank or pulley on the shaft A, on one end of which is a gear-wheel, A', which meshes with and gives motion to the three several gear-wheels B C D, arranged on the respective shafts B' C' D', as indicated by the red arrows on each. The gear-wheel C gives motion to the wheel E on the shaft E', and the wheel E in turn gives motion to the wheel F on the shaft F'. The wheel D drives a pinion, $a$, on the roller G, and through said pinion and roller motion is communicated to the roller H underneath it. The wheel B in a similar manner drives the roller I, and the roller I gives motion through similar gearing to the roller J above it. The journals of all these rollers and cylinders are suitably supported in the side pieces of the machine, and the direction of their rotation is indicated by the arrows on each.

On the opposite side of the machine from that on which the above-described gearing is placed is arranged an endless belt, passing over and around several pulleys, to give motion to the other parts of the machine, as will be now described.

The shaft A, above described, has upon that end of it opposite to the gear-wheel A' a large pulley, K, around which, and around the several pulleys L M N O, all of which run in the direction indicated by the red arrows on each, passes an endless belt, Q, which gives the pulleys L M N O their motion. The rollers G J are governed by a pair of springs, $b$—one at each end thereof—so that they may rise, if necessary, but be held with the rollers H I below them with force sufficient to hold back the seeds while the fiber is combed out by the rotating brushes P P, which are arranged, respectively, on the shafts on which the pulleys L O are placed, and rotate in the direction indicated by the arrows on each.

To a wrist-pin, $c$, Fig. 3, are attached two rods, $d\ d$, running in opposite directions and connected to bell-cranks $e\ e$, which in turn are united to the shafts $f f$ in such manner that the eccentric motion of the wrist-pin will produce a transverse motion of the shafts $f f$. The shafts $f f$ extend through the machine, and have upon them curved fingers $i$, which are close to or in contact with the rollers I H for cleaning them, and preventing any fiber, seed, or gummy matter from adhering to them.

The machine thus far described would appear to be but two machines put together, or mere duplication of devices. Such, however, is not the case, as will be seen from the subjoined description of the other parts of the machine with which those above described work in unison, viz:

R is a hopper, into which the cotton to be cleaned is thrown. Its bottom is furnished with openings $m$, through which the hooked teeth $n$ on the feed-rollers F' E' pass to catch and draw down the cotton into the machine, the material from its nature requiring a forced feed, as its fibers do not readily separate. The rollers F' E' turn toward each other, as indicated by the red arrows on them, and their teeth consequently form with each other claws or grippers for bringing the cotton through the openings $m$ and downward until the two rotating brushes S S catch it. These brushes S S move in a contrary direction, or from each other, and they divide the material drawn down by the feed-rolls, throwing one half to the right and the remaining half to the left of the machine, whence each half of the material is directed to the finishing rolls and brushes by the inclined guides $h\ l$. After the material is fed into the machine and divided, and portions thrown to the right and to the left of the machine, then the operation is substantially the same at both ends of the machine—viz., the material is carried through between rolls G H and I J, leaving the seeds behind, while the brushes P P comb out and throw the clean cotton out of the machine.

Our machine may be said to be one wherein the material is fed in a kind of bat, which is divided up and passes through the machine in different directions, the cleaned material coming out at both ends, or as having one feeding-point and two delivering-points. By thus arranging two hooked cylinders to take the cotton from the hopper a more positive and certain feed is had than with a single cylinder, because when the cotton is only caught and drawn from a single point the material above it will not drop down to supply its place, owing to the adhesive properties of the fiber; but with our contrivance, taking up, as it were, the whole of the bottom of the hopper, it not only grips and draws in the cotton to the cleaner, but pulls that which is above it down within the reach of the closing-together teeth. The arrangement of the rotating brushes S S close together, but running in opposite directions, so as to catch, divide, and start in different directions the cotton drawn in, makes the machine compact in its construction.

Having thus fully described the nature of our invention, we would state that we are aware that Alexander Jones has represented in his patent of April 25, 1837, two machines united in one frame; but they have no necessary connection with each other, nor is there any part of the operation of cleaning or feeding that is common to both machines, as in ours. We do not therefore claim the uniting together of two machines; but

What we do claim herein as new, and desire to secure by Letters Patent, is—

The so arranging of the hopper R, feed-rolls F' E', and brushes S S as that they shall draw in the material, divide it into nearly equal parts, and throw one half in one direction and the remaining half in a contrary direction to be acted upon by other rolls and brushes, as herein set forth and explained.

JAMES H. KINYON.
    JAMES HOLLINGSWORTH.

Witnesses:
 J. TUCKER,
 THOS. W. PLANT.